T. TURNER.
VALVE.
APPLICATION FILED MAY 20, 1910.

969,576.

Patented Sept. 6, 1910.

Witnesses

Inventor
Thomas Turner,
By Joshua R. H. Potts.
Attorney

UNITED STATES PATENT OFFICE.

THOMAS TURNER, OF PHILADELPHIA, PENNSYLVANIA.

VALVE.

969,576.  Specification of Letters Patent.  Patented Sept. 6, 1910.

Application filed May 20, 1910. Serial No. 562,361.

*To all whom it may concern:*

Be it known that I, THOMAS TURNER, a citizen of the United States, residing at Philadelphia, in the county of Philadelphia and State of Pennsylvania, have invented certain new and useful Improvements in Valves, of which the following is a specification.

My invention relates to improvements in valves and more particularly to globe valves designed for controlling the passage of fluid, the object of the invention being to provide a valve of this type which renders it unnecessary to employ packing around the stem of the valve to prevent leakage.

A further object is to provide an improved valve and valve stem, the latter having an annular enlargement provided with a ground surface adapted to engage the ground surface of the bushing secured on the valve casing and provide said enlargement with a conical surface, engaged by a conical wall of a recess in a cap nut screwed onto the bushing, and so construct the valve and the stem with relation to the bushing that the valve and the stem are permitted a certain amount of lateral movement so that the beveled surface of the enlargement on the stem centers itself in the beveled recess in the nut and insures a perfect engagement between the nut and the enlargement, causing the nut to hold the enlargement in tight contact with the end of the bushing insuring a tight joint and permitting adjustment to take up wear.

With these and other objects in view, the invention consists in certain novel features of construction and combinations and arrangements of parts, as will be more fully hereinafter described and pointed out in the claims.

Figure 1:
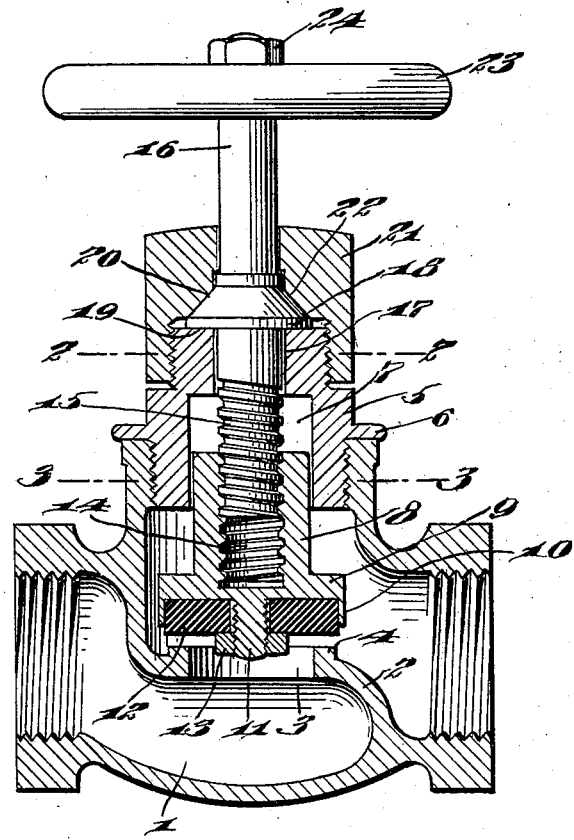
Figure 2:
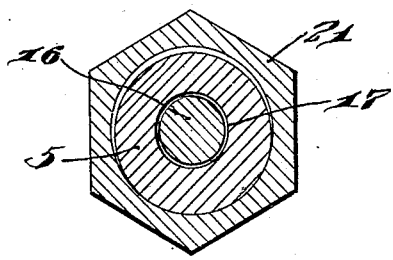
Figure 3:
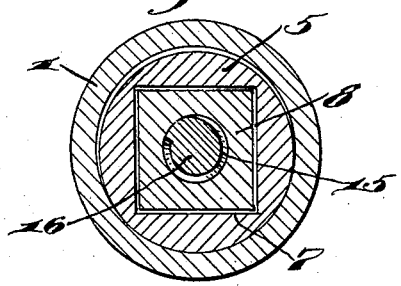

In the accompanying drawings: Figure 1, is a view in longitudinal section illustrating my improvements. Fig. 2, is a view in section on the line 2—2, of Fig. 1, and Fig. 3, is a view in section on the line 3—3, of Fig. 1.

1, represents the valve casing which is divided by a partition 2, and the latter provided with an opening 3 for the passage of fluid, and having a circular flange 4 around said opening forming a valve seat.

In the upper end of the casing 1, a bushing 5 is screwed and is provided with a circular flange 6 to fit tightly against the casing and make a tight joint. This bushing 5 is made with an angular recess 7, in which an angular extension 8 on my improved valve 9 is adapted to move. The valve 9 is provided on its lower face with a circular flange 10, and centrally with a screw-threaded lug 11. A washer 12 is positioned around the lug 11 and inclosed in the circular flange 10, and serves to engage the valve seat 4, said washer being secured to the valve by means of a nut 13 screwed onto the lower end of lug 11.

The extension 8 is made with a central screw-threaded recess 14, into which the screw-threaded portion 15 of a valve stem 16 is screwed. This valve stem 16 projects through an opening 17 in the bushing 5, and is provided with an annular enlargement 18 having a ground flat lower face 19 bearing against the ground upper end of bushing 5. The enlargement 18 is made with a conical or beveled face 20, and a cap nut 21 screwed onto the upper end of bushing 5, is provided with a conical recess 22 engaging the conical face 20 of enlargement 18.

A suitable hand-hold 23 is secured on the upper end of stem 16 by means of a nut 24, and by turning this hand-hold 23, the screw-threaded engagement between the stem 16 and the extension 8 will cause the valve to move up and down as will be readily understood.

It will be noted that while the extension 8 is of the same angular shape as the recess 7 in bushing 5, the recess is of an internal diameter appreciably greater in all directions than is the diameter of extension 8, so that a certain amount of lateral movement is permitted the extension 8 in recess 7. It will also be noted that the diameter of the stem 16 is appreciably less than the diameter of the opening 17 in bushing 5, so that the stem is allowed a certain amount of lateral movement in this opening.

By reason of the lateral movement which is permitted the valve extension 8 in the recess 7 and the stem 16 in the opening 17, the stem and the valve may be moved laterally by the cap nut 21, when the latter is screwed down with its beveled or conical recess 22 in engagement with the conical surface 20 of enlargement 18. This is of extreme importance as it is a very difficult matter to construct these two surfaces 20 and 21, so that they will exactly center the stem when the nut is screwed against the enlargement, but by providing a slight lateral movement as above set forth, the surfaces are permitted an engagement throughout and the enlargement 18 can be uniformly pressed down so that its ground face 19 will smoothly engage the ground face of the upper end of bushing 5, and thereby insure a tight joint and allow adjustment to take up wear.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a valve, the combination with a casing, a partition in the casing having an opening therethrough and a valve seat around said opening, of a bushing screwed into the casing and having an opening therethrough, a valve, a stem projecting through the bushing and having screw-threaded engagement with said valve, means for preventing rotary movement of the valve, an annular enlargement on said stem having a flat face engaging the end of a bushing and a beveled or conical outer face, a cap nut screwed onto the bushing and having a conical recess engaging the conical face of the enlargement, said stem having lateral movement in the bushing, substantially as described.

2. In a valve, the combination with a casing, a partition in said casing having an opening therethrough and a valve seat around the opening, of a bushing screwed into the casing, said bushing having an angular recess in its lower end and a circular opening in its upper end communicating with said recess, a valve adapted to close against said seat, an angular extension on said valve projecting into the recess in the bushing and of a diameter appreciably less than the diameter of the recess, a valve stem located in the opening in the bushing and of a diameter appreciably less than the diameter of said opening, said stem having screw-threaded engagement with the valve extension, whereby when said stem is turned the valve will be moved toward and away from its seat, an annular conical enlargement on said stem bearing against the end of said bushing, and a cap nut screwed onto said bushing and having a conical recess engaging the enlargement on the stem, substantially as described.

3. In a valve, the combination with a casing, a partition in said casing having an opening therethrough, and a valve seat around the same, of a bushing screwed into the casing, said bushing having an angular recess in its lower end, and a circular opening in its upper end communicating with said recess, a valve adapted to close against said seat, an angular extension on said valve projecting into the recess in the bushing, and of a diameter in all directions appreciably less than the diameter of the recess, said extension having a screw-threaded recess therein, a valve stem located in the opening in the bushing and of a diameter appreciably less than the diameter of said opening, a screw-threaded end on said stem engaging in the screw-threaded recess in the valve extension, an annular enlargement on said stem having a flat face engaging the upper end of said bushing, said enlargement having a conical or beveled face, and a cap nut screwed onto said bushing and having a beveled or conical recess, the wall of which engaging the beveled or conical face of said stem, substantially as described.

In testimony whereof I have signed my name to this specification in the presence of two subscribing witnesses.

THOMAS TURNER.

Witnesses:
J. O. EBERHARD, Jr.,
ADA E. TURNER.